(12) United States Patent
Nobuhira et al.

(10) Patent No.: US 11,777,178 B2
(45) Date of Patent: Oct. 3, 2023

(54) BATTERY MODULE, VEHICLE PROVIDED WITH SAME, AND BUS BAR

(71) Applicant: SANYO Electric Co., Ltd., Daito (JP)

(72) Inventors: Takayuki Nobuhira, Hyogo (JP); Takatoshi Kageyama, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 437 days.

(21) Appl. No.: 16/981,720

(22) PCT Filed: Nov. 16, 2018

(86) PCT No.: PCT/JP2018/042374
§ 371 (c)(1),
(2) Date: Sep. 17, 2020

(87) PCT Pub. No.: WO2019/187312
PCT Pub. Date: Oct. 3, 2019

(65) Prior Publication Data
US 2021/0036296 A1 Feb. 4, 2021

(30) Foreign Application Priority Data
Mar. 30, 2018 (JP) .................... 2018-069570

(51) Int. Cl.
*H01M 50/502* (2021.01)
*H01M 50/50* (2021.01)
*H01M 50/209* (2021.01)
*H01M 50/289* (2021.01)
*B60L 50/64* (2019.01)
*H01M 50/249* (2021.01)

(52) U.S. Cl.
CPC .......... *H01M 50/502* (2021.01); *B60L 50/64* (2019.02); *H01M 50/209* (2021.01);
(Continued)

(58) Field of Classification Search
CPC ............ H01M 50/502; H01M 50/209; H01M 50/249; H01M 50/289; H01M 50/50;
(Continued)

(56) References Cited

U.S. PATENT DOCUMENTS

| 2010/0062329 A1* | 3/2010 | Muis ................... H01M 10/486 429/158 |
| 2011/0303459 A1* | 12/2011 | Chuang ............... H01M 50/516 174/75 R |

(Continued)

FOREIGN PATENT DOCUMENTS

| CN | 107851767 A | 3/2018 |
| JP | 2016-213026 A | 12/2016 |

(Continued)

OTHER PUBLICATIONS

International Search Report dated Feb. 5, 2019, issued in counterpart International Application No. PCT/JP2018/042374. (1 page).
(Continued)

*Primary Examiner* — Brian R Ohara
(74) *Attorney, Agent, or Firm* — WHDA, LLP

(57) ABSTRACT

A battery module includes a plurality of battery cells each including an electrode terminal, and a bus bar that connects respective electrode terminals of adjacent battery cells in a state where the plurality of battery cells are stacked, wherein the bus bar includes a first bus bar having a first thickness, and a second bus bar having a second thickness larger than the first thickness, the first bus bar is connected to the respective electrode terminals of the adjacent battery cells, and the second bus bar is in non-contact with electrode terminals of the battery cells.

8 Claims, 16 Drawing Sheets

(52) U.S. Cl.
CPC ....... *H01M 50/249* (2021.01); *H01M 50/289* (2021.01); *H01M 50/50* (2021.01); *H01M 2220/20* (2013.01)

(58) Field of Classification Search
CPC .......... H01M 2220/20; H01M 50/528; H01M 50/584; H01M 50/586; H01M 50/588; H01M 50/593; B60L 50/64; Y02T 10/70; Y02E 60/10
See application file for complete search history.

(56) References Cited

U.S. PATENT DOCUMENTS

| | | | | |
|---|---|---|---|---|
| 2012/0231641 | A1* | 9/2012 | Sugai | H01M 50/502 439/115 |
| 2014/0147722 | A1 | 5/2014 | Doornpekamp et al. | |
| 2018/0151862 | A1 | 5/2018 | Bessho et al. | |

FOREIGN PATENT DOCUMENTS

| | | |
|---|---|---|
| WO | 2011/065422 A1 | 6/2011 |
| WO | 2017/017915 A1 | 2/2017 |

OTHER PUBLICATIONS

English Translation of Chinese Search Report dated Jun. 13, 2022, issued in counterpart CN application No. 201880092079.1. (3 pages).

The Extended European Search Report dated Apr. 23, 2021, issued in counterpart EP Application No. 18911803.7. (9 pages).

* cited by examiner

BATTERY MODULE, VEHICLE PROVIDED WITH SAME, AND BUS BAR

TECHNICAL FIELD

The present invention relates to a battery module, a vehicle including the battery module, and a bus bar.

BACKGROUND ART

The battery module is used as a power source device for driving a vehicle, a power source device for power storage, and the like. Such a battery module is preferably configured to be capable of outputting a large current, and includes a plurality of chargeable and dischargeable battery cells connected in series or in parallel. Furthermore, in recent years, there has been a demand for higher capacity of the battery module, and in particular, it is important to deal with parallelization of a large number of battery cells.

As the battery module including the plurality of battery cells connected in parallel, a battery module described in the following patent literature is known. The battery module described in the following patent literature includes a plurality of battery cells, a plurality of conductive members connected to respective output terminals of the battery cells, and a bus bar that connects the plurality of battery cells in parallel via the plurality of conductive members.

CITATION LIST

Patent Literature

PTL1: Unexamined Japanese Patent Publication No. 2016-213026

SUMMARY OF THE INVENTION

In the above-described battery module, the plurality of conductive members connected to respective electrode terminals of the battery cells must be fixed to one bus bar, and there has been a problem that the conductive members cannot be fixed to the bus bar when relative positions of the bus bar and the plurality of conductive members are displaced.

The present invention has been made in view of such a background, and an object thereof is to provide a technique capable of improving assembly workability in a battery module including a plurality of battery cells connected in parallel.

A battery module according to an aspect of the present invention includes a plurality of battery cells each including an electrode terminal, and a bus bar that connects respective electrode terminals of adjacent battery cells in a state where the plurality of battery cells are stacked. The bus bar includes a first bus bar having a first thickness and a second bus bar having a second thickness larger than the first thickness, the first bus bar is connected to the respective electrode terminals of the adjacent battery cells, and the second bus bar is in non-contact with the electrode terminals of the battery cells.

Furthermore, a bus bar according to an aspect of the present invention connects respective electrode terminals of adjacent battery cells in a state where a plurality of battery cells each including an electrode terminal are stacked. The bus bar includes a first bus bar having a first thickness and a second bus bar having a second thickness larger than the first thickness. The first bus bar includes a terminal connection portion that connects with the respective electrode terminals of the adjacent battery cells, and a first flat portion that is in contact with the second bus bar. The second bus bar includes a second flat portion that is in contact with the first flat portion.

With the above configuration, a second bus bar is connected to a first bus bar that connects adjacent battery cells so that a plurality of battery cells can be connected in parallel, and thus assembly workability can be improved.

DESCRIPTION OF EMBODIMENTS

Figure 1:
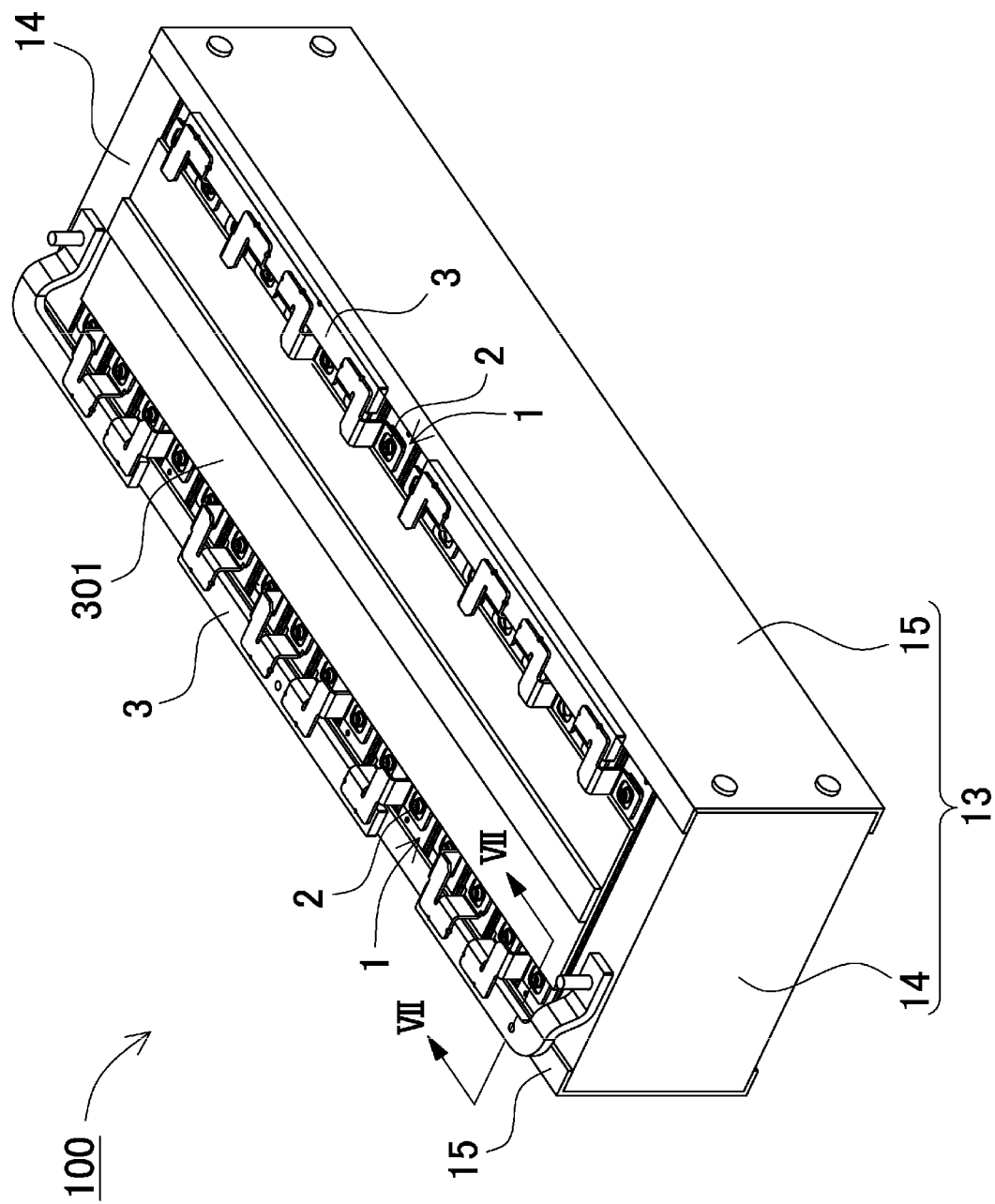
FIG. 1 is a schematic perspective view of a battery module according to a first exemplary embodiment of the present invention.

First, a background of an idea of an exemplary embodiment according to the present invention will be described. In a battery module having a configuration in which a plurality of battery cells are connected in parallel via a bus bar, a current flows from the plurality of battery cells into the bus bar, and thus the flowing current flowing through the bus bar is relatively larger than a current flowing through a bus bar that connects a plurality of battery cells in series. Since heat is generated when a large current flows through a bus bar having a large electrical resistance, it is preferable to use a bus bar having a small electrical resistance as a bus bar that connects a plurality of battery cells in parallel.

Meanwhile, in a case of a configuration in which the plurality of battery cells are connected by the bus bar, displacement of each battery cell may be a problem. In particular, since the battery cells have dimensional variations due to manufacturing tolerances, it is preferable to use a flexible bus bar so that the displacement of the connected battery cells can be absorbed. In order to increase flexibility of the bus bar, it is effective to reduce thickness of the bus bar. However, since the bus bar having a small thickness has a large electrical resistance, there is a problem that heat is generated when a large current flows, as described above. As described above, reduction of the electrical resistance of the bus bar and improvement of the flexibility are essentially contradictory, and it is difficult to achieve both at the same time.

With respect to this problem, the inventors of the present invention have found that in the bus bar that connects the plurality of battery cells in parallel has a portion where a flowing current is smaller than other portions, and the present invention has been completed.

In a battery module according to an exemplary embodiment of the present invention, the first bus bar includes a terminal connection portion that connects with the electrode terminals of the battery cells, and a first flat portion that is in contact with the second bus bar, and the second bus bar includes a second flat portion that is in contact with the first flat portion. According to the above configuration, the second bus bar is connected to the first bus bar that connects the adjacent battery cells so that the plurality of battery cells can be connected in parallel, and thus assembly workability can be improved.

Furthermore, in a battery module according to another exemplary embodiment of the present invention, the battery cells include a first battery cell and a second battery cell that are adjacently stacked, the terminal connection portion includes a first intermediate piece bent from the first flat portion, first terminal connection piece bent via the first intermediate piece in a first direction, a second intermediate piece bent from the first flat portion in a direction intersecting with the first intermediate piece, and a second terminal connection piece bent via the second intermediate piece in a second direction intersecting with the first direction, the first terminal connection piece is connected to an electrode terminal of the first battery cell, and the second terminal connection piece is connected to an electrode terminal of the second battery cell. According to the above configuration, the first bus bar can be deformed in a plurality of directions, and the flexibility of the bus bar can be further improved.

Furthermore, in a battery module according to another exemplary embodiment of the present invention, the second bus bar forms the second flat portion in a linear shape, and a plurality of the first bus bars are fixed along the second flat portion. According to the above configuration, positioning of the first bus bar and the second bus bar is easy, and the assembly workability can be further improved.

Moreover, in a battery module according to another exemplary embodiment of the present invention, first bus bars located at both ends out of the plurality of first bus bars are fixed in a posture in which the second terminal connection piece is projected outward. With the above configuration, it is possible to easily deal with deformation due to expansion of the battery cells.

Moreover, a battery module according to another exemplary embodiment of the present invention, the second bus bar is bent at an edge to form a second edge connection portion that connects with an external connection portion. According to the above configuration, a position of the second edge connection portion that connects with the external connection portion can be designed relatively freely.

Moreover, in a battery module according to another exemplary embodiment of the present invention, the battery cells are connected in parallel. With the above configuration, even if an amount of current flowing through the bus bar due to a parallel connection increases, it is possible to ensure a current flow performance with the thick second bus bar.

Moreover, a vehicle according to another exemplary embodiment of the present invention includes the battery module, a running motor that is supplied with electric power from the battery module, a vehicle body where the battery module and the running motor are mounted, and wheels that are driven by the running motor to run the vehicle body.

Moreover, a bus bar according to another exemplary embodiment of the present invention is a bus bar that connects respective electrode terminals of adjacent battery cells in a state where a plurality of battery cells each including an electrode terminal are stacked, the bus bar including a first bus bar having a first thickness, and a second bus bar having a second thickness larger than the first thickness, wherein the first bus bar includes a terminal connection portion that connects with the respective electrode terminals of the adjacent battery cells, and a first flat portion that is in contact with the second bus bar, and the second bus bar includes a second flat portion that is in contact with the first flat portion.

Hereinafter, exemplary embodiments of the present invention will be described with reference to the drawings. However, the exemplary embodiments described below are examples for embodying the technical idea of the present invention, and the present invention is not limited to the following. Furthermore, in the present specification, members shown in the claims are not limited to members in the exemplary embodiments. Especially, sizes, materials, and shapes of components and relative disposition between the components, which are described in the exemplary embodiments, do not limit the scope of the present invention but are simply description examples as long as there is no specific description in particular. Note that the sizes, positional relationships, and the like of members illustrated in the drawings are sometimes exaggerated for clarity of description. Furthermore, in the following description, the same names and reference numerals indicate the same or similar members, and detailed description thereof will be appropriately omitted. Furthermore, regarding each element constituting the present invention, a plurality of elements may be formed of the same member, and one member may serve as the plurality of elements. Conversely, a function of one member may be shared by a plurality of members to be implemented.

The battery module according to the exemplary embodiments is used for various applications, especially as a power source suitable for high electric power and high current applications such as a power source that is mounted on an electric vehicle such as a hybrid vehicle or an electric automobile to supply electric power to a running motor, a power source that stores electric power generated by natural energy such as solar power generation and wind power generation, or a power source that stores midnight electric power.

[First Exemplary Embodiment]

Figure 2:
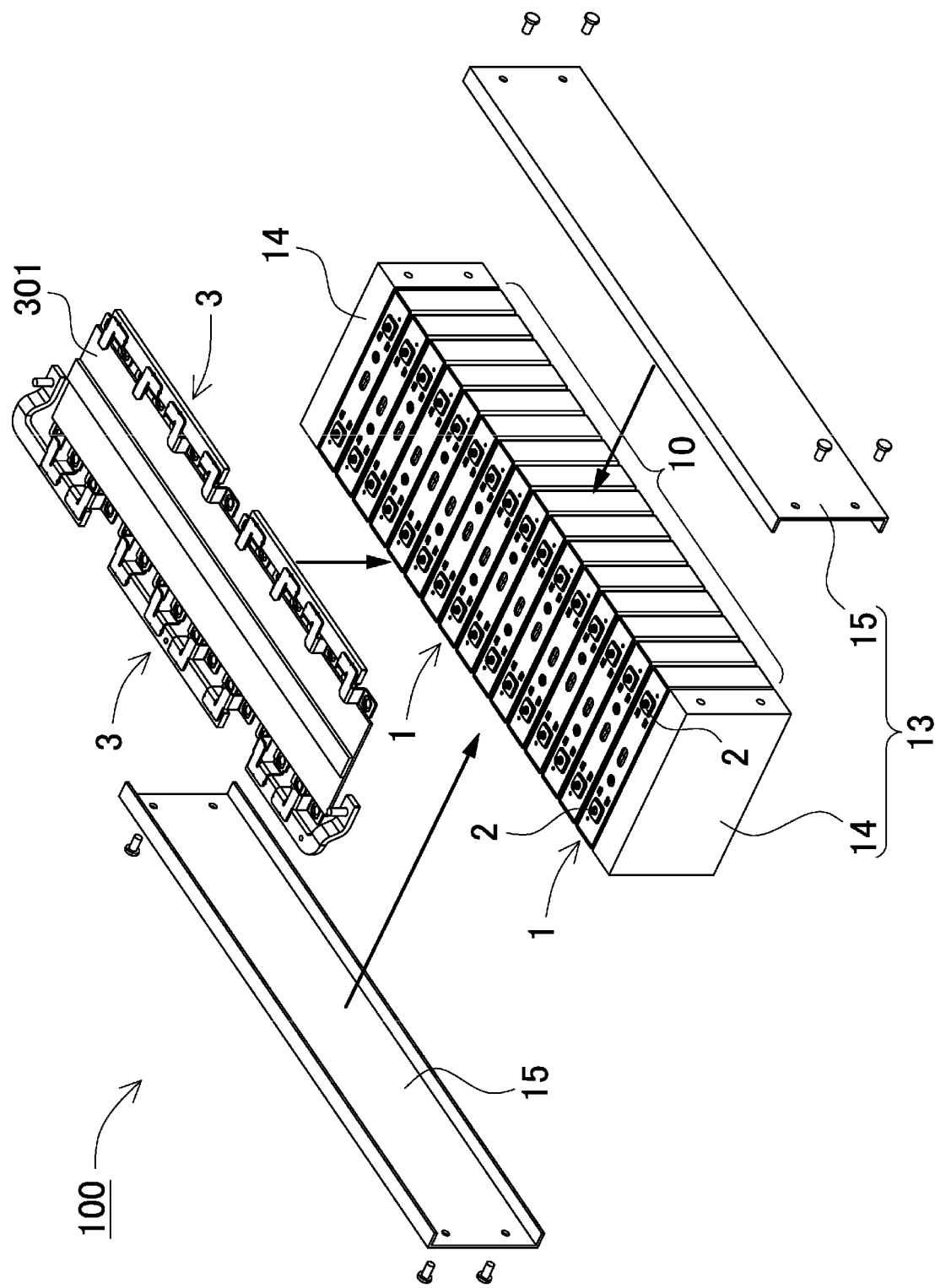
FIG. 2 is an exploded perspective view of the battery module illustrated in FIG. 1.
Figure 3:
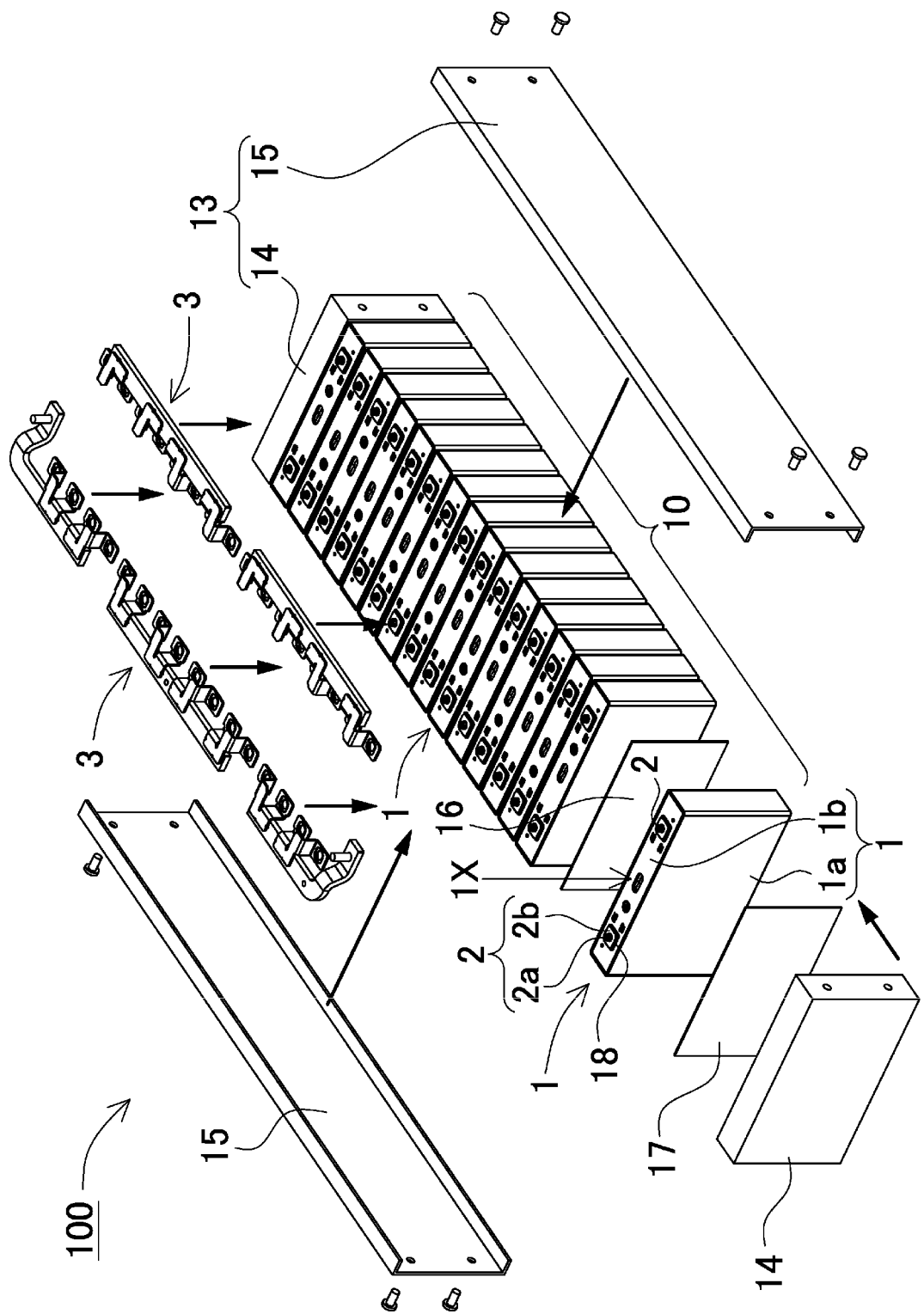
FIG. 3 is an exploded perspective view illustrating the battery module illustrated in FIG. 2, from which a bus bar holder is omitted.
Figure 4:
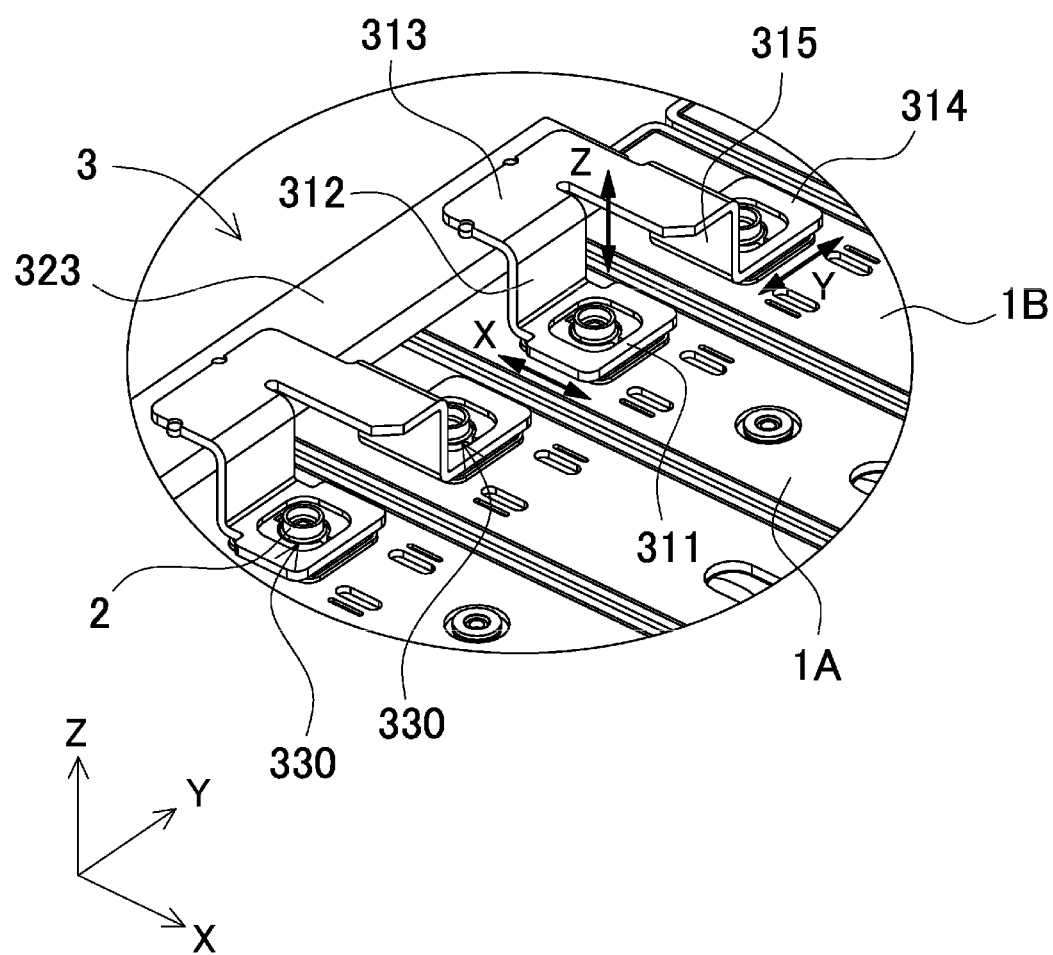
FIG. 4 is an enlarged perspective view illustrating a coupling structure of battery cells and a bus bar.

FIG. 1 is a perspective view of battery module 100 according to a first exemplary embodiment of the present invention, FIG. 2 is an exploded perspective view of battery module 100, FIG. 3 is an exploded perspective view in which bus bar holder 301 is omitted from FIG. 2, FIG. 4 is an exploded perspective view illustrating a coupling structure of bus bar 3 and electrode terminals. Battery module 100 illustrated in FIGS. 1 and 2 includes a plurality of battery cells 1 including positive and negative electrode terminals 2, bus bars 3 connected to electrode terminals 2 of the plurality of battery cells 1 to connect the plurality of battery cells 1 in parallel and in series, and bus bar holder 301 that holds bus bars 3, and the plurality of battery cells 1 are connected in parallel and in series via these bus bars 3. Battery cells 1 are chargeable and dischargeable secondary batteries. In battery module 100, a plurality of battery cells 1 are connected in parallel to form a parallel battery group, a plurality of parallel battery groups are connected in series, and a large number of battery cells 1 are connected in parallel and in series. Battery module 100 illustrated in FIG. 1 and FIG. 2 has the plurality of battery cells 1 stacked to form battery stack 10, and battery stack 10 is fixed with fixing component 13 to fix the plurality of battery cells 1 in a stacked state. Fixing component 13 includes a pair of end plates 14 disposed on both end faces of stacked battery cells 1 and fastening member 15 that couples end portions thereof to end plates 14 to fix stacked battery cells 1 in a pressurized state.

(Battery Cell 1)

Each of battery cells 1 is a prismatic battery whose main surface, which is a wide surface, has a rectangular outer shape, and has a thickness smaller than a width. Furthermore, each of battery cells 1 is a chargeable and dischargeable secondary battery, and is a lithium ion secondary battery. However, the present invention does not limit the battery cell to the prismatic battery or the lithium ion secondary battery. For the battery cell, all chargeable batteries, for example, non-aqueous electrolyte secondary batteries other than the lithium ion secondary battery, and a nickel metal hydride battery cell may be used.

In each of battery cells 1, an electrode body in which positive and negative electrode plates are stacked is housed in exterior can 1a, which is filled with an electrolyte solution, and airtightly sealed. Exterior can 1a is formed in a rectangular tube shape with a closed bottom, and an upper opening is airtightly closed with sealing plate 1b made of a metal plate. Exterior can 1a is manufactured by deep drawing on a metal plate such as aluminum or aluminum alloy. Similarly to exterior can 1a, sealing plate 1b is manufactured with a metal plate such as aluminum or aluminum alloy. Sealing plate 1b is inserted into the opening of exterior can 1a, boundary between an outer periphery of sealing plate 1b and an inner periphery of exterior can 1a is irradiated with a laser beam, and sealing plate 1b is airtightly fixed to exterior can 1a by laser welding.

(Electrode terminal 2)

In each of battery cells 1, sealing plate 1b, which is a top surface, is used as terminal surface 1X, and positive and negative electrode terminals 2 are fixed to both end portions of terminal surface 1X. As illustrated in FIG. 3, positive and negative electrode terminals 2 are fixed to sealing plate 1b via insulating material 18 and are respectively connected to positive and negative electrode plates (not illustrated) incorporated in each of battery cells 1. Positive and negative electrode terminals 2 are each provided with welding surface 2b around projecting portion 2a. Welding surface 2b has a planar shape parallel to a surface of sealing plate 1b, and projecting portion 2a is provided at a center of welding surface 2b. In each of electrode terminals 2 in FIG. 4, projecting portion 2a has a cylindrical shape. However, the projecting portion does not necessarily have to have the cylindrical shape, and may have a polygonal cylindrical shape or an elliptic cylindrical shape, although these shapes are not illustrated.

Positions of positive and negative electrode terminals 2 fixed to sealing plate 1b of each of battery cells 1 are positions where a positive electrode and a negative electrode are laterally symmetrical. With this structure, battery cells 1 are laterally inverted and stacked, and adjacent positive and negative electrode terminals 2 are connected by bus bars 3, so that adjacent battery cells 1 can be connected in series.

(Battery Stack 10)

The plurality of battery cells 1 are stacked so that a thickness direction of each battery cell 1 is a stacking direction to form battery stack 10. Battery stack 10 has the plurality of battery cells 1 stacked so that terminal surfaces 1X, that is, sealing plates 1b in the figures, on which positive and negative electrode terminals 2 are provided are flush with each other.

As illustrated in FIG. 3, battery stack 10 has insulating spacers 16 sandwiched between stacked battery cells 1. Each of insulating spacers 16 in the figure is manufactured in a thin plate shape or a sheet shape, with an insulating material such as resin. Each of insulating spacers 16 illustrated in the figure has a plate shape having substantially the same size as a facing surface of each of battery cells 1, and one of insulating spacers 16 is stacked between battery cells 1 adjacent to each other, so that adjacent battery cells 1 are insulated from each other. Note that, as a spacer disposed between adjacent battery cells 1, a spacer having a shape in which a cooling gas flow path is formed between one of battery cells 1 and the spacer may also be used. Furthermore, a surface of each of battery cells 1 may be covered with an insulating material. For example, a surface of the exterior can excluding an electrode portion of the battery cell may be heat-welded with a shrink tube made of polyethylene terephthalate (PET) resin or the like. In this case, insulating spacers 16 may be omitted. Furthermore, in battery module 100 according to the exemplary embodiments, the plurality of battery cells are connected in multiple parallel and in multiple series. Thus, one of insulating spacers 16 is sandwiched between battery cells connected to each other in series, but in battery cells connected to each other in parallel, a voltage difference does not occur between adjacent exterior cans, so that an insulating spacer between these battery cells may be omitted.

Furthermore, in battery module 100 illustrated in FIG. 3, end plates 14 are disposed on both end faces of battery stack 10 with end face spacers 17 interposed between end plates 14 and battery stack 10. As illustrated in FIG. 3, end face spacers 17 are disposed between battery stack 10 and end plates 14 to insulate end plates 14 from battery stack 10. Each of end face spacers 17 is manufactured in a thin plate shape or a sheet shape, with an insulating material such as resin. End face spacers 17 illustrated in the figure each have a size and shape capable of covering an entire facing surface of one of prismatic battery cells 1, and are stacked between battery cells 1 disposed at both ends of battery stack 10 and end plates 14.

In battery stack 10, metal bus bars 3 are connected to positive and negative electrode terminals 2 of adjacent battery cells 1, and the plurality of battery cells 1 are connected in parallel and in series via bus bars 3. In battery stack 10, in a plurality of battery cells 1 connected to each other in parallel to form the parallel battery group, the plurality of battery cells 1 are stacked so that positive and negative electrode terminals 2 provided at both end portions of terminal surfaces 1X have the same direction laterally, and in respective battery cells 1 forming the parallel battery groups connected to each other in series, the plurality of battery cells 1 are stacked so that positive and negative electrode terminals 2 provided at both end portions of terminal surfaces 1X are laterally inverted. Here, in battery module 100 according to the first exemplary embodiment illustrated in FIG. 3, 12 battery cells 1 are stacked in the thickness direction to form battery stack 10, four battery cells 1 are connected in parallel to form the parallel battery group, and three sets of parallel battery groups are connected in series to connect 12 battery cells 1 in four-parallel and three-series. Therefore, in battery stack 10 illustrated in FIG. 3, four battery cells 1 forming the parallel battery group are stacked so that positive and negative electrode terminals 2 have the same direction laterally, and three sets of parallel battery groups each including four battery cells 1 stacked in the same direction are stacked so that positive and negative electrode terminals 2 are alternately laterally inverted. However, the present invention does not limit a number of battery cells forming the battery stack and a connection state thereof. The number of battery cells forming the battery stack and the connection state thereof may be variously changed, including another exemplary embodiment described later.

In battery module 100 according to the exemplary embodiments, in battery stack 10 in which the plurality of battery cells 1 are stacked on each other, electrode terminals 2 of the plurality of battery cells 1 adjacent to each other are connected by bus bars 3, to connect the plurality of battery cells 1 in parallel and in series.

(Bus Bar Holder 301)

Battery module 100 can dispose the plurality of bus bars 3 at fixed positions on an upper surface of battery stack 10 while the plurality of bus bars 3 are insulated from each other and the terminal surfaces of the battery cells are insulated from bus bars 3, by disposing bus bar holder 301 between battery stack 10 and bus bars 3 as illustrated in FIGS. 1 and 2. As bus bar holder 301 described above, for example, a structure may be adopted where an inner side of a holder main body on which the plurality of bus bars 3 are disposed is divided into a plurality of sections, to have compartments in each of which corresponding one of bus bars 3 is disposed. Bus bar holder 301 is formed with, for example, an insulating material such as plastic, and can dispose the plurality of bus bars 3 at the fixed positions on the upper surface of battery stack 10 while electrode terminals having a potential difference are insulated, by disposing the plurality of bus bars 3 at the fixed positions in a fitting structure. Note that, in FIG. 3 and subsequent figures, in order to make it easy to understand a connection state between the battery cells and bus bars 3, bus bar holder 301 that disposes the plurality of bus bars 3 at the fixed positions is not illustrated.

(Bus Bar 3)

Bus bars 3 are manufactured by cutting and processing a metal plate into a predetermined shape. For the metal plate forming bus bars 3, a metal having a low electrical resistance and a low weight, such as an aluminum plate or a copper plate, or an alloy thereof may be used. However, for the metal plate of bus bars 3, other metals or alloys thereof, which have a low electrical resistance and a low weight, may also be used.

In the present exemplary embodiment, bus bars 3 that connect electrode terminals 2 of the plurality of battery cells 1 in a predetermined connection state have unique structures. Hereinafter, a detailed structure of bus bars 3 will be described in detail with reference to FIGS. 3 to 7. Bus bars 3 connect facing electrode terminals 2 of battery cells 1 disposed adjacent to each other among the plurality of battery cells 1 stacked in a predetermined arrangement, to connect a large number of battery cells 1 in parallel and in series. Bus bars 3 illustrated in FIG. 4 are disposed so as to face the upper surface of battery stack 10, which is terminal surfaces 1X of battery cells 1, and connect the plurality of electrode terminals 2 disposed in the stacking direction of the plurality of battery cells 1 in a substantially linear shape, on both sides of battery stack 10.

Figure 5:
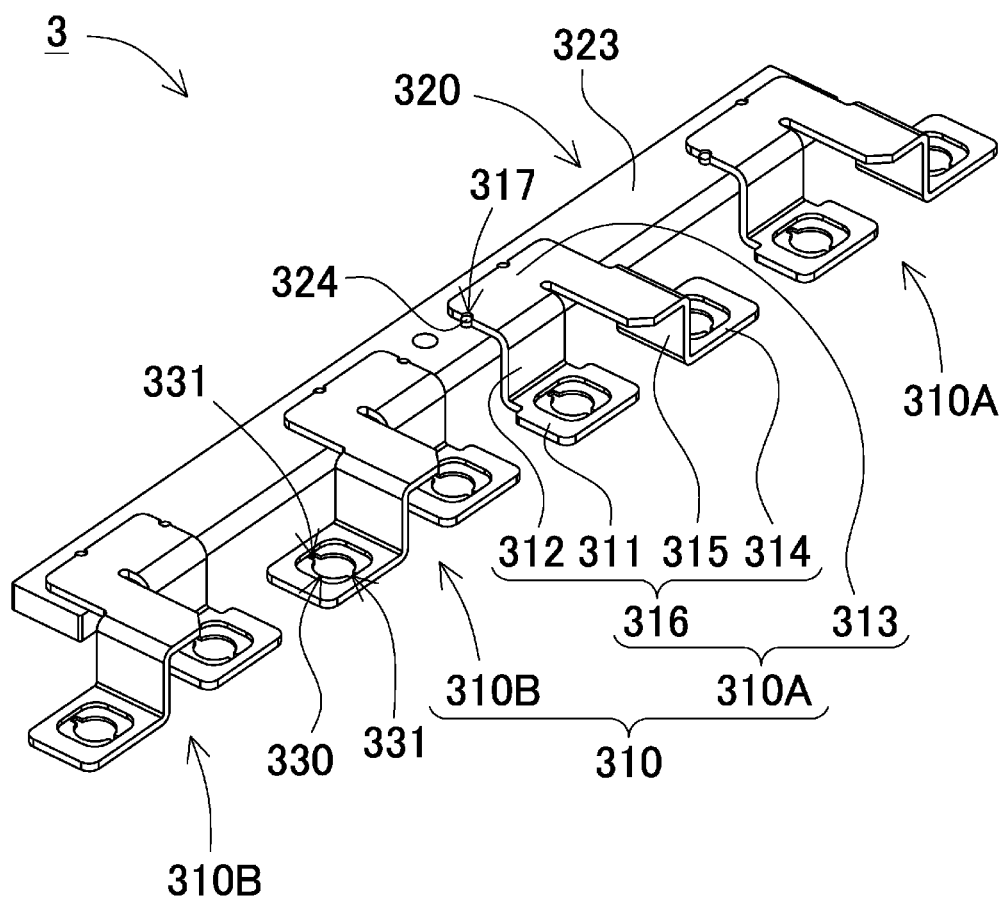
FIG. 5 is a perspective view of the bus bar according to the first exemplary embodiment.
Figure 6:
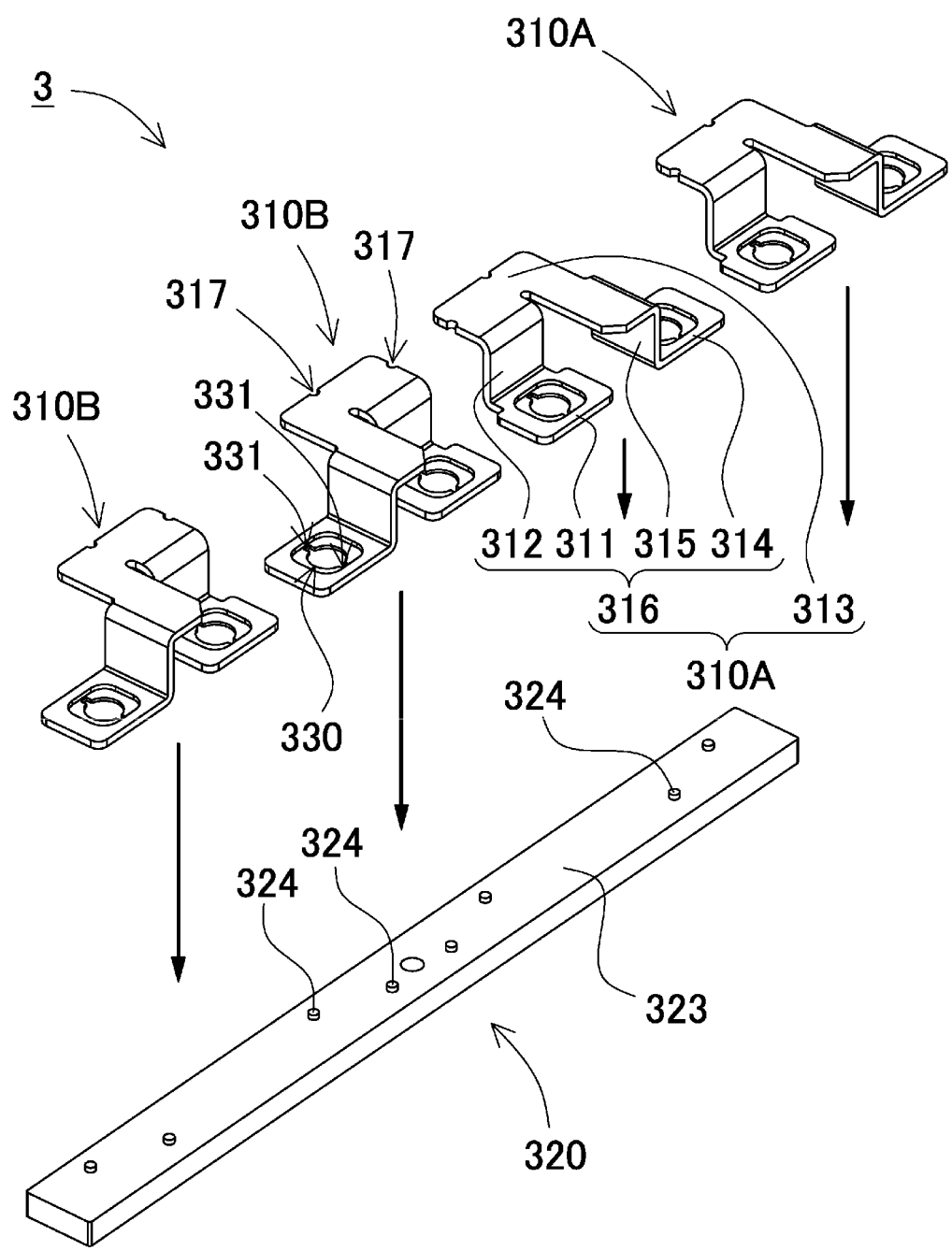
FIG. 6 is an exploded perspective view of the bus bar in FIG. 5.
Figure 7:
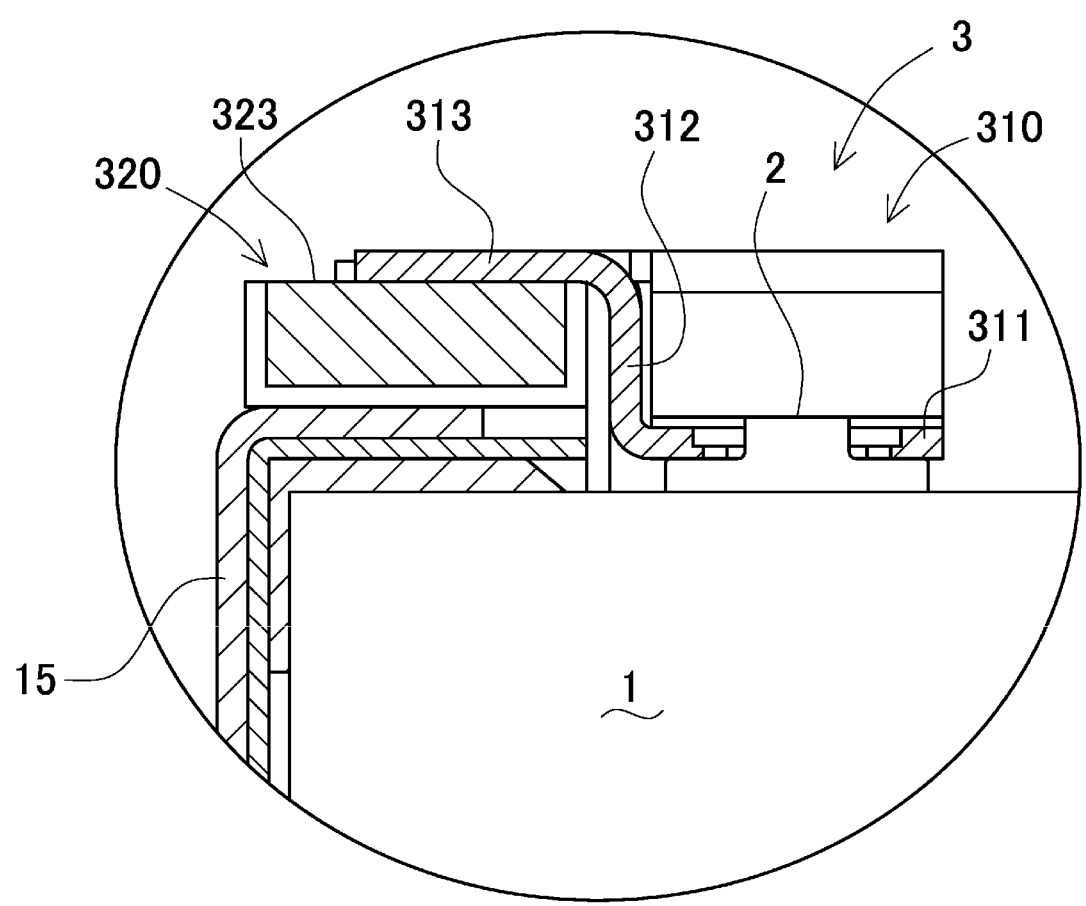
FIG. 7 is a sectional view taken along line VII-VII in FIG. 1.

As illustrated in FIGS. 5 and 6, bus bars 3 each include first bus bar 310 having a first thickness and second bus bar 320 having a second thickness larger than the first thickness. First bus bar 310 is connected to respective electrode terminals 2 of adjacent battery cells 1, and second bus bar 320 is not in contact with electrode terminals 2 of battery cells 1. With this structure, thin and easily deformable first bus bar 310 absorbs variation in positions of electrode terminals 2 of battery cells 1, so that followability and assemblability at a time of fixing bus bars 3 to battery cells 1 can be ensured. On the other hand, forming second bus bar 320 to be thick makes it possible to reduce the electrical resistance and ensure a current flow performance of a large current due to connection of battery cells 1.

Meanwhile, forming first bus bar 310 to be thin also makes it possible to have a thermal fuse function. That is, first bus bar 310 can be melted when a large current flows, to enhance safety. As described above, dividing each of bus bars 3 into first bus bar 310 and second bus bar 320 makes it possible to achieve both contradictory problems of followability of the electrode terminals and control of heat generation.

(First Bus Bar 310)

First bus bar 310 includes terminal connection portion 316 that connects with electrode terminals 2 of battery cells 1 and first flat portion 313 that is in contact with second flat portion 323 of second bus bar 320.

Furthermore, terminal connection portion 316 of first bus bar 310 includes first intermediate piece (=board) 312 bent from first flat portion 313, first terminal connection piece 311 bent via first intermediate piece 312 in a first direction, second intermediate piece 315 bent from first flat portion 313 in a direction intersecting with first intermediate piece 312, and second terminal connection piece 314 bent via second intermediate piece 315 in a second direction intersecting with the first direction. As illustrated in FIG. 4, first terminal connection piece 311 is connected to electrode terminal 2 of one battery cell 1, and second terminal connection piece 314 is connected to electrode terminal 2 of battery cell 1 adjacent to the one battery cell 1.

With this structure, it is possible to deal with displacement of the electrode terminals. Depending on an environment in which the battery module is used, relative positional relationship between the electrode terminals may shift. For example, since the battery cells expand due to charge and discharge, when the plurality of battery cells are stacked, an amount of movement of the electrode terminals in the stacking direction increases as a number of stacked battery cells increases. In addition, in a vehicle-mounted battery module, as a result of the stacked battery cells being displaced by vibration or impact, the relative positional relationship between the electrode terminals shifts, and a load is applied to the bus bar connecting the electrode terminals. Therefore, the bus bar is provided with a mechanism for absorbing such displacement. Specifically, bending first terminal connection piece 311 and second terminal connection piece 314 via first intermediate piece 312 and second intermediate piece 315, respectively, in directions orthogonal to each other ensures the flexibility due to bending. In addition, making first bus bar 310 of a thin metal also contributes to deformability. As described above, providing first bus bar 310 with the flexibility capable of following displacement of positions of electrodes enhances reliability of connection between bus bars 3 and electrode terminals 2. Furthermore, the assemblability during an assembling work of the battery module is also ensured.

This situation will be described with reference to an example in which respective electrode terminals 2 of first battery cell 1A and second battery cell 1B which are illustrated in FIG. 4 and adjacently stacked are connected by first bus bar 310. In this example, first terminal connection piece 311 is welded to electrode terminal 2 of first battery cell 1A, and second terminal connection piece 314 is welded to electrode terminal 2 of second battery cell 1B. In this state, when first battery cell 1A and second battery cell 1B are displaced in an X direction, first terminal connection piece 311 moves accordingly. First terminal connection piece 311 is provided via first flat portion 313 and first intermediate piece 312, and can be bent and deformed. That is, by bending at a bent portion between first intermediate piece 312 and first terminal connection piece 311, and at a bent portion between first intermediate piece 312 and first flat portion 313, first terminal connection piece 311 can be moved somewhat in the direction indicated by arrow X in FIG. 4.

On the other hand, when electrode terminal 2 relatively moves in a Y direction, displacement is absorbed by second terminal connection piece 314. Second terminal connection piece 314 is bent via second intermediate piece 315 in a direction substantially orthogonal to first intermediate piece 312. As a result, second terminal connection piece 314 can be moved somewhat in the direction indicated by arrow Y in FIG. 4.

Furthermore, even when electrode terminal 2 relatively moves in a Z direction, each of first intermediate piece 312 and second intermediate piece 315 can be bent and inclined to absorb a height difference, and thus it is possible to deal with relative displacement in the direction indicated by arrow Z in FIG. 4.

As described above, even if a position of electrode terminal 2 of battery cell 1 is varied, absorbing displacement by deformation of first bus bar 310 makes it possible to alleviate occurrence of a load on a mechanical connection portion between first bus bar 310 and electrode terminal 2, and improve stability and reliability of connection.

First terminal connection piece 311 and second terminal connection piece 314 are each provided with opening 330. Opening 330 is formed in a circular shape and is welded to electrode terminal 2 of battery cell 1 by laser welding or the like as illustrated in FIG. 4. Furthermore, as illustrated in FIGS. 5 and 6, opening 330 has recesses 331 formed in parts of the circular shape. Recesses 331 are preferably provided in respective portions facing via a center of circular opening 330. This structure makes it easy to bend on a line passing through the center, and the flexibility of first terminal connection piece 311 and second terminal connection piece 314 can be increased to improve the followability during deformation.

First bus bar 310 is preferably formed with a material having excellent conductivity and flexibility. Here, first bus bar 310 is made of a metal such as an aluminum plate, copper, or nickel. Furthermore, if necessary, a surface of first bus bar 310 may be plated. As a type of plating, nickel or the like can be used.

(Second Bus Bar 320)

Second bus bar 320 is formed to be thicker than first bus bar 310. Second bus bar 320 includes second flat portion 323 that is in contact with first flat portion 313 of first bus bar 310. Forming second bus bar 320 to be thick and increasing a cross-sectional area in this way makes it possible to reduce the electrical resistance and suppress heat generation or the like even when a large current flows.

Furthermore, extending second flat portion 323 in a plate shape makes it easy to fix a plurality of first bus bars 310 along a length direction of second flat portion 323. In addition, a guide may be provided so that a position for fixing first bus bar 310 to second bus bar 320 can be easily positioned. As an example of the guide, in FIG. 6, protrusions 324 are formed on second flat portion 323 of second bus bar 320, while recessed portions 317 that receive protrusions 324 are formed on first flat portion 313 of first bus bar 310. With this structure, recessed portions 317 can be brought into contact with protrusions 324, and first bus bar 310 can be fixed to a predetermined position of second bus bar 320. Furthermore, recessed portions 317 are preferably formed on two intersecting sides. This structure can prevent first bus bar 310 from being displaced in a rotating direction.

Forming second bus bar 320 with the same material as first bus bar 310 makes it easy to weld first bus bar 310 and second bus bar 320. However, second bus bar and first bus bar may be formed with different materials. For example, first bus bar may be changed to a metal material suitable for welding depending on a material of electrode terminals 2. As described above, a design according to the battery cells used is easy.

First bus bar 310 and second bus bar 320 are fixed to each other. First bus bar 310 and second bus bar 320 are fixed by first flat portion 313 of first bus bar 310 and second flat portion 323 of second bus bar 320. For this fixing, welding or mechanical connection such as screwing by bolts or caulking can be used.

Furthermore, it is preferable that a fixing position of first flat portion 313 of first bus bar 310 and second flat portion 323 of second bus bar 320 does not overlap with a connecting position between first terminal connection piece 311 and second terminal connection piece 314 and electrode terminals 2. For example, as illustrated in the perspective view of FIG. 4 and a sectional view of FIG. 7, first flat portion 313 and second flat portion 323 are disposed to be superposed on an outer side of a row of electrode terminals 2 of stacked battery cells 1. With this structure, when electrode terminal 2 of battery cell 1 and first bus bar 310 are welded, it is possible to exclude second flat portion 323 from an upper space of a portion to be welded and ensure an open space, and obtain an advantage that laser welding can be performed smoothly without interference of second flat portion 323. For example, after first bus bar 310 and second bus bar 320 are welded, this bus bar can be assembled and welded to battery stack 10.

Second bus bar 320 can fix the plurality of first bus bars 310. In an example of FIGS. 5 and 6, four first bus bars 310 are fixed to second bus bar 320. Furthermore, in an example illustrated in FIGS. 8 and 9 described later, two first bus bars 310 are fixed to second bus bar 320. In this way, a number of the first bus bars is determined according to a number of battery cells 1 to be connected. Furthermore, a length of the second flat portion of the second bus bar can be adjusted according to the number of the first bus bars. In other words, changing the second bus bar makes it possible to fix a different number of the first bus bars, and thus it is possible to deal with connection of a different number of battery cells 1.

When the plurality of first bus bars 310 are arranged and fixed to second flat portion 323 of second bus bar 320, first bus bars 310 located at edges of second flat portion 323 are fixed in a posture in which second terminal connection pieces 314 are located on outer sides. In this case, first bus bar 310 whose outer shape is laterally inverted is prepared in advance. In FIG. 6, first bus bar 310A and first bus bar 310B have laterally inverted shapes. With such a disposition, it is possible to deal with a situation in which battery cells located at the edges out of the stacked battery cells especially tend to spread laterally due to expansion. In other words, fixing the first bus bars in a posture in which the second terminal connection pieces project to both sides so that the first bus bars are in a posture to be easily deformed in the stacking direction of the battery cells makes it possible to obtain an advantage that a connection state between the bus bar and the electrode terminals can be stably maintained even when such expansion of the battery cells occurs.

[Second Exemplary Embodimen]

The above second bus bar has been described as an example in which the entire second bus bar is formed in a flat plate shape. However, the present invention does not limit the second bus bar to this shape, and the second bus bar may include a second edge connection portion that connects with an external connection portion. Such an example is illustrated in perspective view of FIG. 8 and an exploded perspective view of FIG. 9 as a bus bar according to a second exemplary embodiment. In these figures, first bus bar 310 is similar to that in the described-above first exemplary embodiment, and detailed description thereof will be omitted.

Similarly to the first exemplary embodiment, bus bar 3B according to the second exemplary embodiment is also provide with second flat portion 323B to second bus bar 320B. Meanwhile, second bus bar 320B according to the second exemplary embodiment is provided with second edge connection portion 340 at an edge. In the example illustrated in FIGS. 8 and 9, second flat portion 323B of second bus bar 320B is bent at the edge thereof to provide second edge connection portion 340. With this structure, the bus bar can be easily electrically connected to an outside. This structure is particularly suitable for taking out a large current, and this bus bar can be suitably provided on an end face of a battery stack to be used for taking out a total potential of a plurality of battery cells.

Second edge connection portion 340 preferably has connection pin 341 projecting. With this structure, it is easy to connect with an external terminal. A stud bolt can be suitably used for connection pin 341. Furthermore, connection pin 341 is joined to second edge connection portion 340 by caulking, press fitting, bonding or the like. Therefore, it is preferable to form a hole for press-fitting connection pin 341 on second edge connection portion 340.

Figure 8:
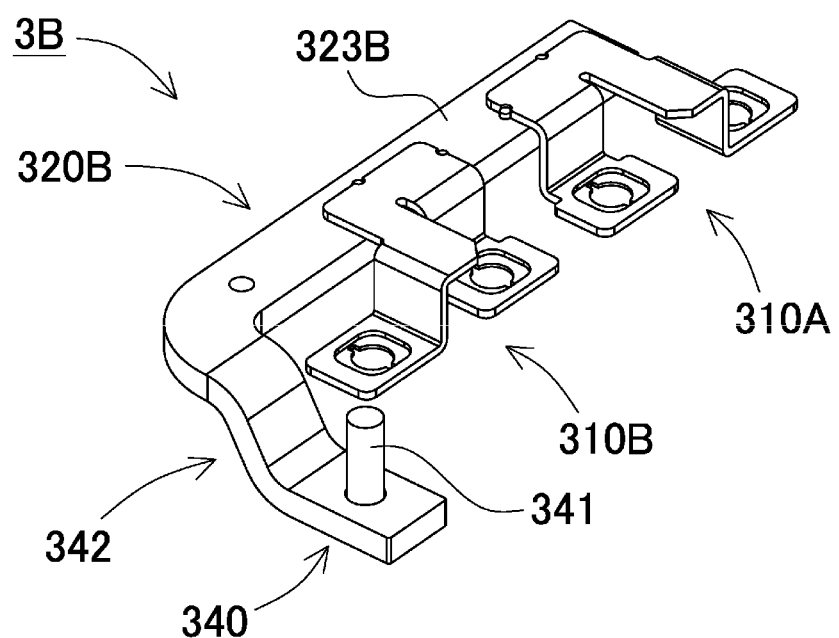
FIG. 8 is a perspective view of a bus bar according to a second exemplary embodiment.
Figure 9:
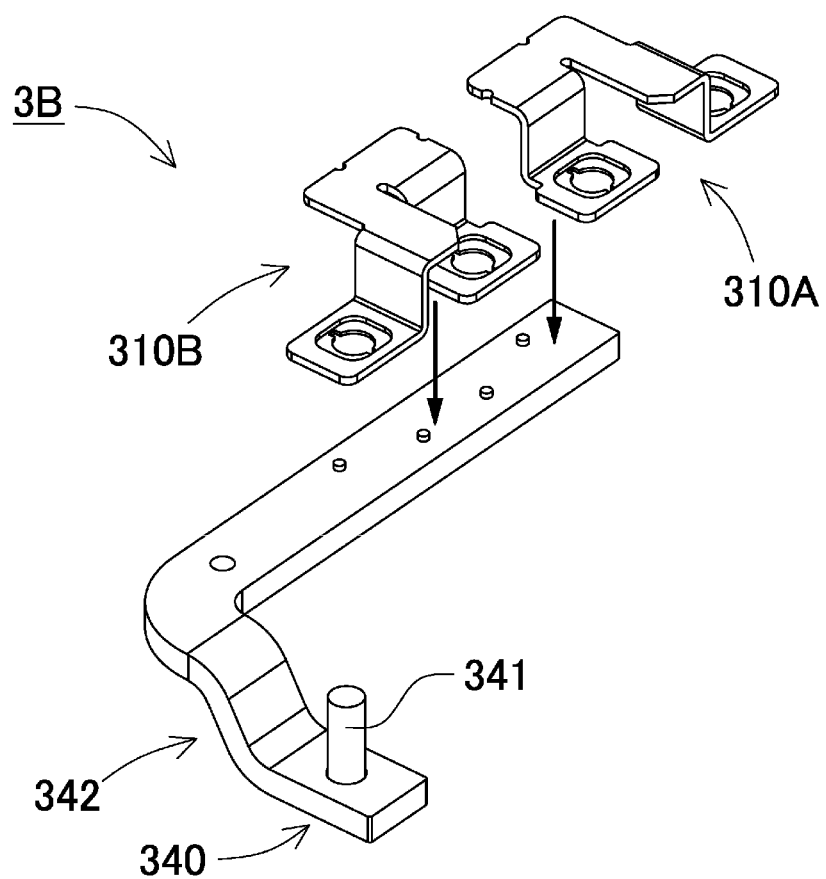
FIG. 9 is an exploded perspective view of the bus bar in FIG. 8.

Furthermore, second edge connection portion 340 preferably has second bent portion 342 formed between second edge connection portion 340 and second flat portion 323B so that flexibility to allow some displacement can be provided to connection pin 341. In the example illustrated in FIGS. 8 and 9, second bent portion 342 is provided so as to continuously incline downward from second edge connection portion 340. With this structure, even if connection pin 341 is relatively displaced, such displacement can be absorbed by second bent portion 342 and stability of connection can be maintained. In the example of FIG. 8 and the like, second edge connection portion 340 is a surface lower than second flat portion 323B.

[Modified Example]

In the above examples, the examples in which the plurality of first bus bars are fixed to the second bus bar have been described. However, the present invention does not limit the number of the first bus bars to a plurality, and one first bus bar may be fixed to the second bus bar. For example, in the example of FIG. 5 and the like, the example in which two connection pieces of first terminal connection piece 311 and second terminal connection piece 314 are provided on one first bus bar 310 has been described, but three or more terminal connection pieces may also be provided. In this case, it is preferable that the terminal connection pieces have the same distance from battery cells 1 to a bus bar. With this structure, even if a parallel number of battery cells 1 is changed, a change of a route can be prevented.

Figure 10:
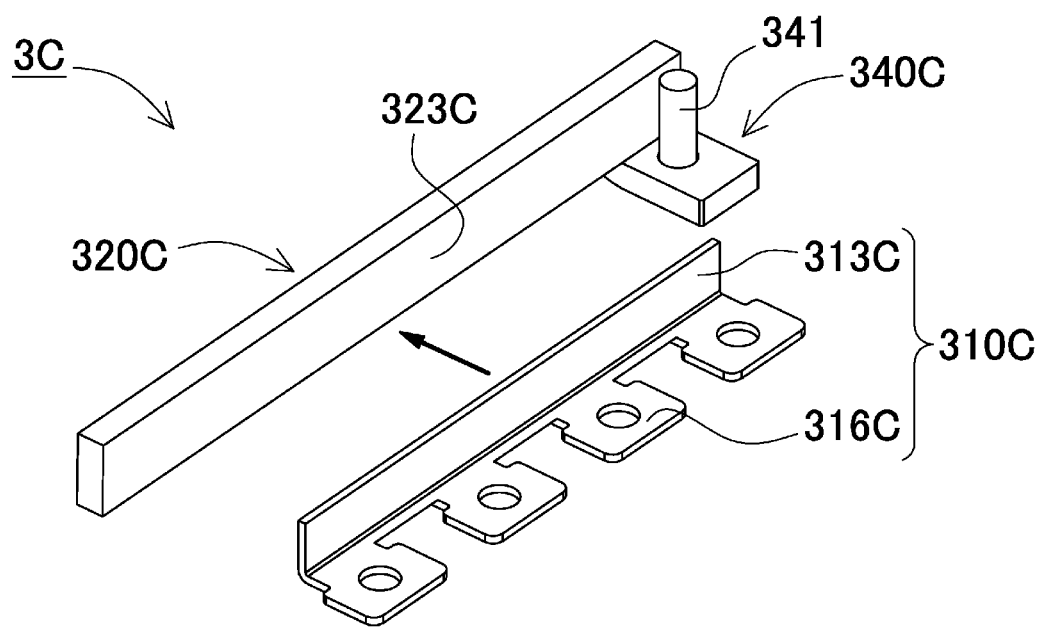
FIG. 10 is an exploded perspective view illustrating a bus bar according to a modified example.
Figure 11:
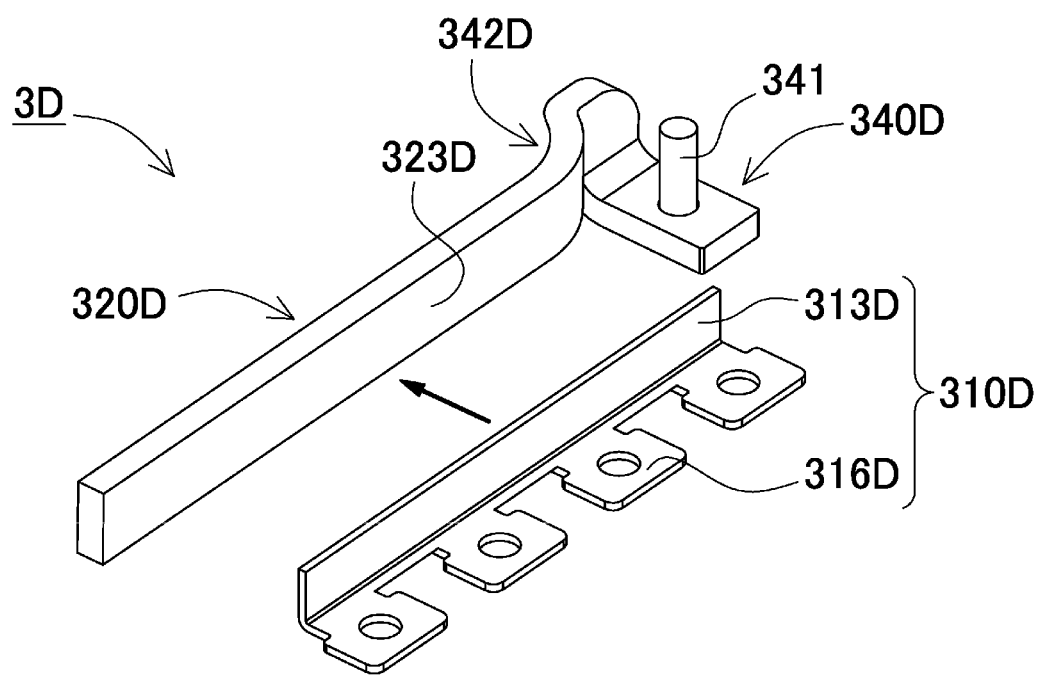
FIG. 11 is an exploded perspective view illustrating a bus bar according to the modified example.
Figure 12:
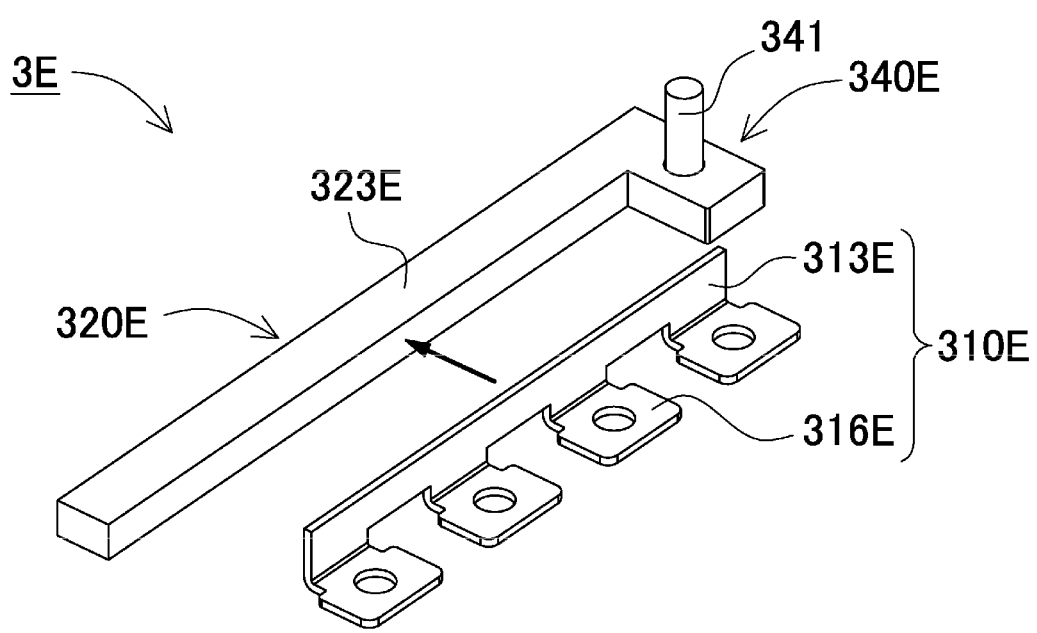
FIG. 12 is an exploded perspective view illustrating a bus bar according to the modified example.
Figure 13:
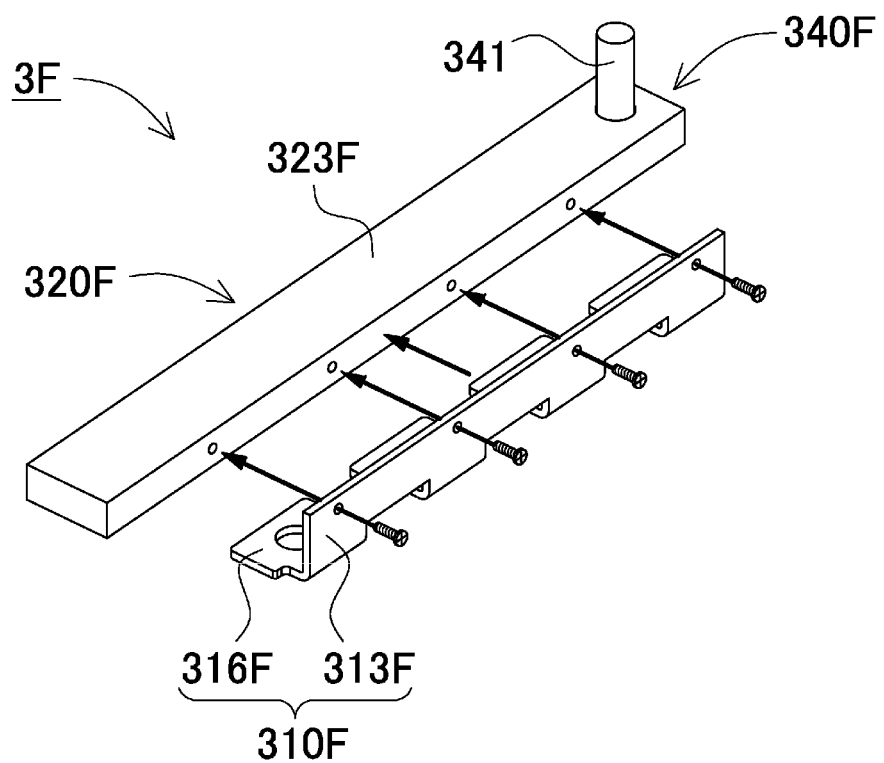
FIG. 13 is an exploded perspective view illustrating a bus bar according to the modified example.

As a modified example, examples in which a number of terminal connection pieces is three or more are illustrated in FIGS. 10, 11, 12, and 13. In bus bar 3C, 3D, 3E, 3F illustrated in these examples, first bus bar 310C, 310D, 310E, 310F is provide with first flat portion 313C, 313D, 313E, 313F, respectively, and terminal connection portion 316C, 316D, 316E, 316F is bent from first flat portion 313C, 313D, 313E, 313F in advance. In addition, four terminal connection pieces are provided as terminal connection portion 316C, 316D, 316E, 316F. First bus bar 310C, 310D, 310E, 310F is fixed to second bus bar 320C, 320D, 320E, 320F by welding or screwing. FIGS. 10 to 12 illustrate examples of fixing first bus bar 310C, 310D, 310E and second bus bar 320C, 320D, 320E by welding, and FIG. 13 illustrates an example of fixing first bus bar 310F and second bus bar 320F by screwing. Integrating a plurality of bus bars into one bus bar in this way makes it possible to obtain an advantage that a positioning work can be simplified when the bus bar is welded, as compared with a case where the bus bars are individually provided.

Furthermore, terminal connection portion 316C, 316D, 316E, 316F may be capable of accepting some deformation of an electrode terminal by a partial drawing process or the like.

Furthermore, second bus bar 320C, 320D, 320E, 320F is provided with second edge connection portion 340C, 340D, 340E, 340F on one edge (right side in the figures) of second flat portion 323C, 323D, 323E, 323F. Various forms of second edge connection portion 340C, 340D, 340E, 340F can be used. For example, as illustrated in FIGS. 10 and 11, while second flat portion 323C, 323D is in a vertical posture, the edge is formed in an L shape to project downward, the L-shaped projecting portion is bent to be in a horizontal posture, and connection pin 341 is formed. Furthermore, in the example of FIG. 11, providing second bent portion 342D in which an end portion of second flat portion 323D is inclined makes it possible to have a function of absorbing displacement of connection pin 341 at this portion.

In the examples of FIGS. 12 and 13, second flat portion 323E, 323F is in a horizontal posture, and connection pin 341 is erected from an upper surface. Furthermore, in the example of FIG. 12, the edge of second flat portion 323E is formed in an L shape in a plan view, and a position of connection pin 341 is displaced from a main surface of second flat portion 323E.

Using the first bus bar and the second bus bar in such a form also makes it possible to similarly divide the bus bar into a thick bus bar and a thin bus bar, and to deal with heat generation following electrode terminal 2.

The above battery module can be used as a vehicle-mounted power source. As a vehicle on which the battery module is mounted, an electric vehicle such as a hybrid vehicle or a plug-in hybrid vehicle that runs with both an engine and a motor, or an electric automobile that runs only with the motor can be used, and the battery module is used as a power source for these vehicles. Note that examples will be described in which, in order to obtain electric power for driving the vehicle, large capacity and high output battery module 1000 is structured in which a large number of the above-described battery modules are connected in series and in parallel and a necessary controlling circuit is further added.

(Battery Module for Hybrid Vehicle)

Figure 14:
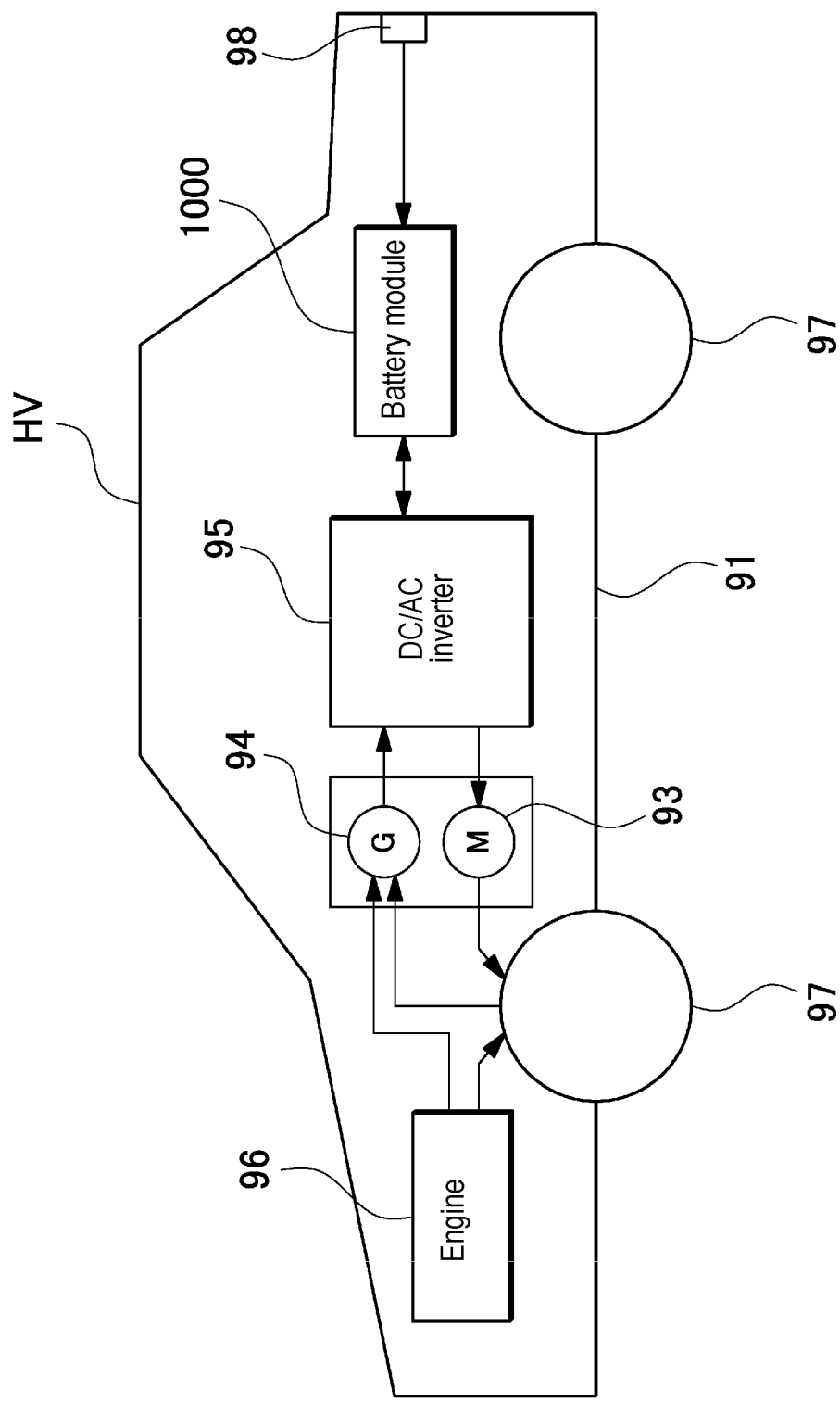
FIG. 14 is a block diagram illustrating an example in which a battery module is mounted on a hybrid vehicle that runs with an engine and a motor.

FIG. 14 illustrates an example in which the battery module is mounted on the hybrid vehicle that runs with both the engine and the motor. Vehicle HV on which the battery module illustrated in this figure is mounted includes vehicle body 91, engine 96 and running motor 93 that run vehicle body 91, wheels 97 that are driven by engine 96 and running motor 93, battery module 1000 that supplies electric power to motor 93, and generator 94 that charges a battery of battery module 1000. Battery module 1000 is connected to motor 93 and generator 94 via direct current (DC)/alternating current (AC) inverter 95. Vehicle HV runs with both motor 93 and engine 96 while charging and discharging the battery of battery module 1000. Motor 93 runs the vehicle by being driven in a region where engine efficiency is low, for example, during acceleration or low speed running. Motor 93 is driven by the electric power supplied from battery module 1000. Generator 94 is driven by engine 96 or regenerative braking when the vehicle is braked, to charge the battery of battery module 1000. Note that vehicle HV may include charging plug 98 for charging power source module 1000, as illustrated in FIG. 14. Connecting charging plug 98 to an external power source makes it possible to charge battery module 1000.

(Battery Module for Electric Automobile)

Figure 15:
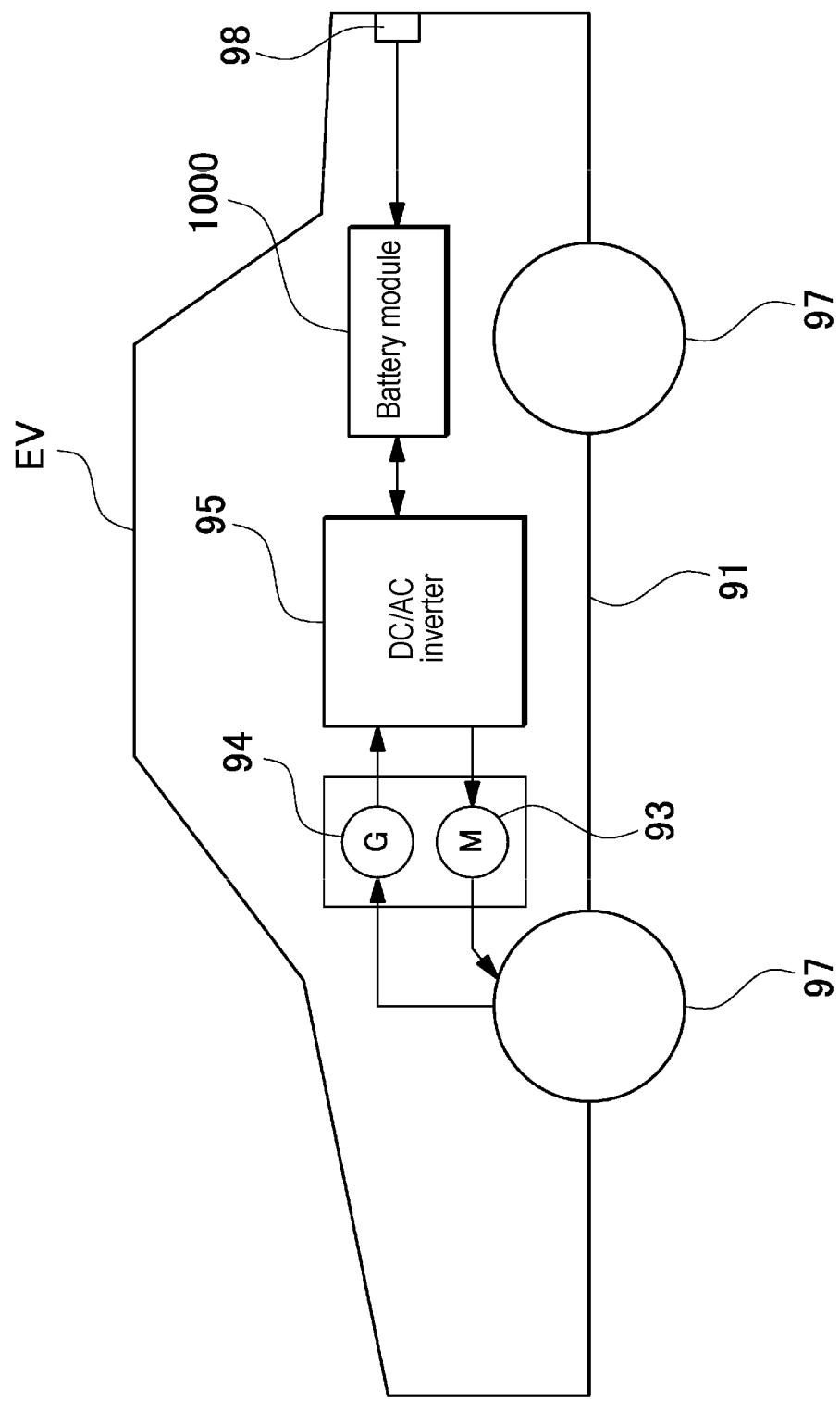
FIG. 15 is a block diagram illustrating an example in which the battery module is mounted on an electric automobile that runs only with the motor.

Furthermore, FIG. 15 illustrates an example in which the battery module is mounted on the electric automobile that runs only with the motor. Vehicle EV on which the battery module illustrated in this figure is mounted includes vehicle body 91, running motor 93 that runs vehicle body 91, wheels 97 that are driven by motor 93, battery module 1000 that supplies electric power to motor 93, and generator 94 that charges a battery of battery module 1000. Battery module 100 is connected to motor 93 and generator 94 via DC/AC inverter 95. Motor 93 is driven by the electric power supplied from battery module 1000. Generator 94 is driven by an energy for regenerative braking of vehicle EV to charge the battery of battery module 1000. Vehicle EV also includes charging plug 98, and can connect charging plug 98 to an external power source to charge battery module 1000.

(Power Storage System)

Figure 16:
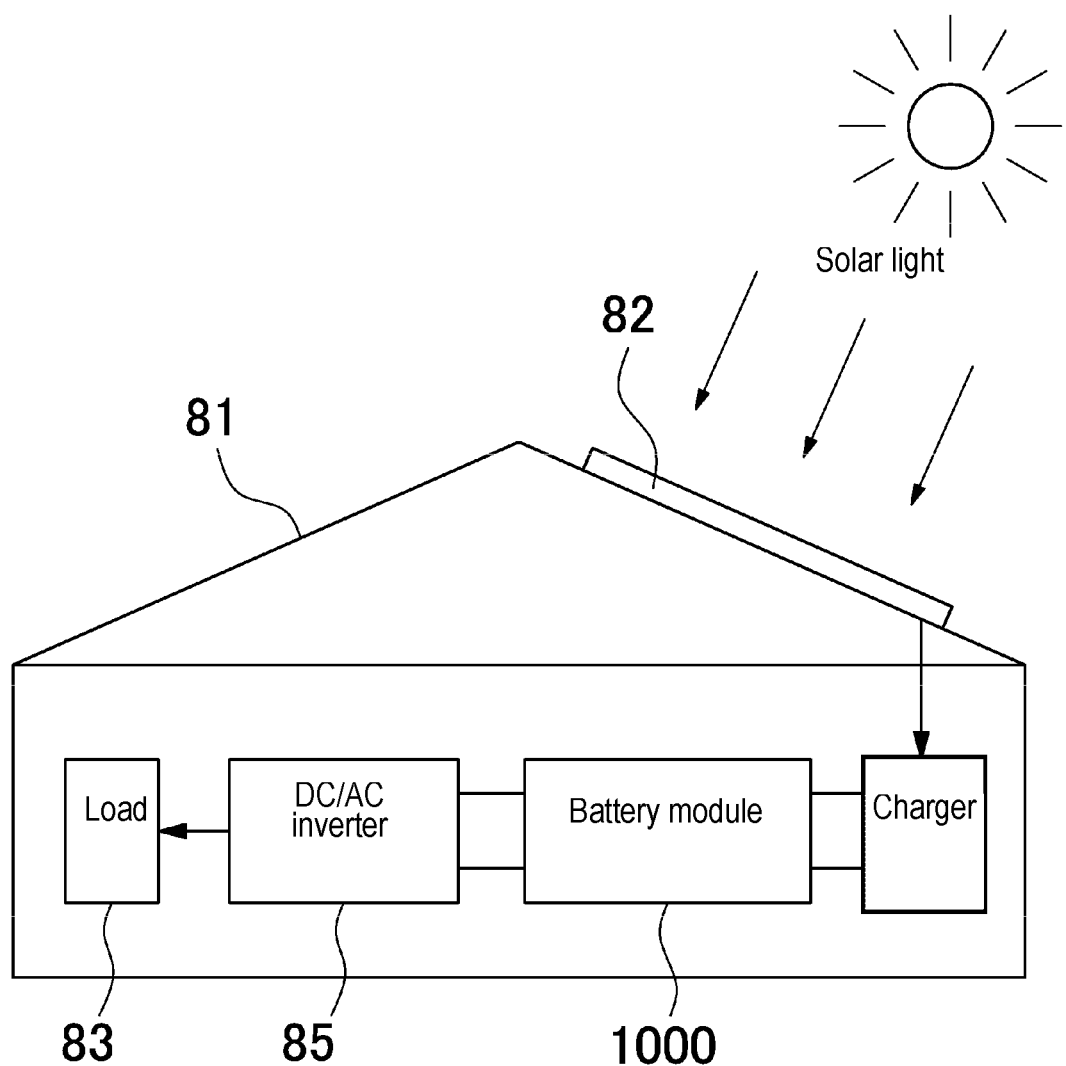
FIG. 16 is a block diagram illustrating an example of applying to the battery module for power storage.

Furthermore, the present invention does not limit applications of the battery module to a power source of the motor that runs the vehicle. The battery module according to the exemplary embodiments can also be used as a power source of a power storage system that charges a battery and stores electric power with electric power generated by solar power generation, wind power generation, or the like. FIG. 16 illustrates a power storage system in which the battery of battery module 1000 is charged by a solar cell to store electric power. As illustrated in the figure, the power storage system illustrated in this figure charges the battery of battery module 100 with electric power generated by solar cell 82 disposed on a roof or a roof floor of building 81 such as a house or a factory. Furthermore, this power storage system supplies the electric power stored in battery module 100 to load 83 via DC/AC inverter 85.

Furthermore, the battery module can also be used as a power source of a power storage system that charges a battery and stores electric power by using midnight electric power at night although the power storage system is not illustrated. The battery module charged with the midnight electric power can be charged with the midnight electric power that is surplus electric power of a power plant, output electric power during a daytime when an electric power load is large, and limit peak power during the daytime to a small value. Furthermore, the battery module can be used as a power source that is charged with both an output of the solar cell and the midnight electric power. This battery module effectively can use both the electric power generated by the solar cell and the midnight electric power to efficiently store electric power while weather and consumed electric power is considered.

The power storage system as described above can be suitably used for applications such as a backup battery module that can be mounted on a computer server rack, a backup battery module for a wireless base station for a cellular phone or the like, a power storage device combined with a solar cell, such as a power source for power storage in a house or a factory and a power source for a street light, and a backup power source for a traffic light, a traffic indicator for a road, or the like.

INDUSTRIAL APPLICABILITY

A battery module cooling method, a cooling program, a computer-readable recording medium and a device storing the program, a battery module, and a vehicle including the battery module according to the present invention can be suitably used as a power source for a large current used for a power source of a motor for driving an electric vehicle such as a hybrid vehicle, a fuel cell automobile, an electric automobile, and an electric motorcycle and the like. Examples of such a battery module includes a battery module for a plug-in hybrid electric automobile and a hybrid electric automobile that can switch between an electric vehicle (EV) driving mode and a hybrid electric vehicle (HEV) driving mode, and an electric automobile. In addition, such a battery module can be appropriately used for applications such as a backup battery module that can be mounted on a computer server rack, a backup battery module for a wireless base station for a cellular phone or the like, a power storage device combined with a solar cell, such as a power source for power storage in a house or a factory and a power source for a street light, and a backup power source for a traffic light or the like.

The invention claimed is:

1. A battery module comprising:
a plurality of battery cells each including an electrode terminal; and
a bus bar that connects respective electrode terminals of adjacent ones of the plurality of battery cells in a state where the plurality of battery cells are stacked,
wherein the bus bar includes
a first bus bar having a first thickness, and
a second bus bar having a second thickness larger than the first thickness,
the first bus bar is connected to the respective electrode terminals of the adjacent ones of the plurality of battery cells, and
the second bus bar is in non-contact with the electrode terminals of the plurality of the battery cells,
wherein the first bus bar includes
a terminal connection portion that connects with the electrode terminals of the plurality of battery cells, and
a first flat portion that is in contact with the second bus bar, and the second bus bar includes a second flat portion that is in contact with the first flat portion, wherein the battery cells include a first battery cell and a second battery cell that are adjacently stacked, the terminal connection portion includes
- a first intermediate piece bent from the first flat portion,
- a first terminal connection piece bent via the first intermediate piece in a first direction,
- a second intermediate piece bent from the first flat portion in a direction intersecting with the first intermediate piece, and
- a second terminal connection piece bent via the second intermediate piece in a second direction intersecting with the first direction, the first terminal connection piece is directly connected to an electrode terminal of the first battery cell, the second terminal connection piece is directly connected to an electrode terminal of the second battery cell, the first terminal connection piece and the second terminal connection piece are connected to each other via the first intermediate piece, the first flat portion, and the second intermediate piece interposed therebetween, and the first flat portion extends in a first plane, the first intermediate piece extends in a second plane intersecting the first plane, the second intermediate piece extends in a third plane intersecting the first plane and the second plane.

2. The battery module according to claim 1, wherein
the second bus bar forms the second flat portion in a linear shape, and
the first bus bar includes a plurality of first bus bars that are fixed along the second flat portion.

3. The battery module according to claim 2, wherein ones of the plurality of first bus bars located at both ends out of the plurality of first bus bars, are fixed in a posture in which each of the second terminal connection pieces is projected outward.

4. The battery module according to claim 1, wherein the second bus bar is bent at an edge to form a second edge connection portion that connects with an external connection portion.

5. The battery module according to claim 1, wherein the plurality of battery cells are connected in parallel.

6. The battery module according to claim 1, wherein
the vehicle comprises:
the battery module;
a running motor that is supplied with electric power from the battery module;
a vehicle body where the battery module and the running motor are mounted; and
wheels that are driven by the running motor to run the vehicle body.

7. A bus bar that connects respective electrode terminals of adjacent battery cells in a state where a plurality of battery cells each including an electrode terminal are stacked, the bus bar comprising:
a first bus bar having a first thickness; and
a second bus bar having a second thickness larger than the first thickness, wherein the first bus bar includes
a terminal connection portion that connects with respective electrode terminals of adjacent ones of the plurality of battery cells, and
a first flat portion that is in contact with the second bus bar, and
the second bus bar includes a second flat portion that is in contact with the first flat portion, wherein the battery cells include a first battery cell and a second battery cell that are adjacently stacked, the terminal connection portion includes
a first intermediate piece bent from the first flat portion,
a first terminal connection piece bent via the first intermediate piece in a first direction,
a second intermediate piece bent from the first flat portion in a direction intersecting with the first intermediate piece, and
a second terminal connection piece bent via the second intermediate piece in a second direction intersecting with the first direction, the first terminal connection piece is directly connected to an electrode terminal of the first battery cell, the second terminal connection piece is directly connected to an electrode terminal of the second battery cell, the first terminal connection piece and the second terminal connection piece are connected to each other via the first intermediate piece, the first flat portion, and the second intermediate piece interposed therebetween, and the first flat portion extends in a first plane, the first intermediate piece extends in a second plane intersecting the first plane, the second intermediate piece extends in a third plane intersecting the first plane and the second plane.

8. A battery module comprising:
a plurality of battery cells each including an electrode terminal; and
a bus bar that connects respective electrode terminals of adjacent ones of the plurality of battery cells in a state where the plurality of battery cells are stacked, wherein the bus bar includes
a first bus bar having a first thickness, and
a second bus bar having a second thickness larger than the first thickness, the first bus bar is connected to the respective electrode terminals of the adjacent ones of the plurality of battery cells, and the second bus bar is in non-contact with the electrode terminals of the plurality of the battery cells, wherein the first bus bar includes
a terminal connection portion that connects with the electrode terminals of the plurality of battery cells, and
a first flat portion that is in contact with the second bus bar, and
the second bus bar includes a second flat portion that is in contact with the first flat portion, wherein the terminal connection portion extends in a first plane, and the first flat portion extends in a second plane intersecting the first plane, and the second flat portion extends parallel to, and in direct contact with, the first flat portion.

* * * * *